United States Patent Office 3,720,763
Patented Mar. 13, 1973

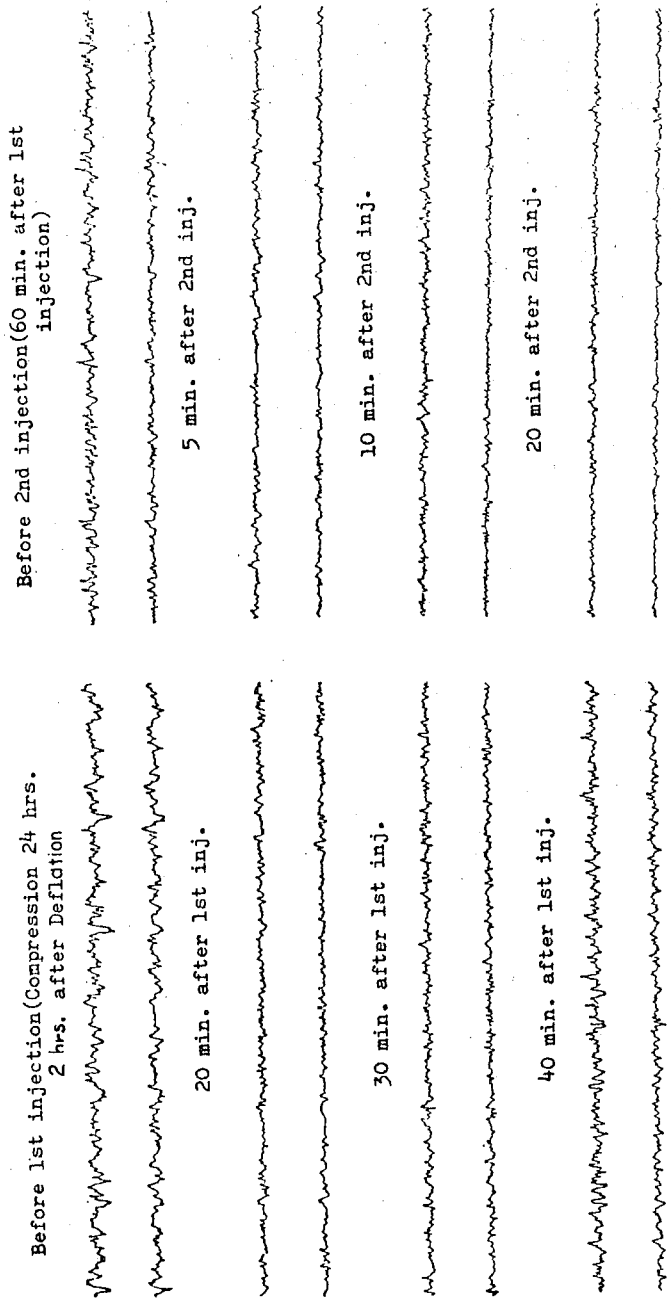

3,720,763
PREPARATION FOR REDUCING CEREBRAL EDEMA AND PROCESS OF PREPARING SAME
Shozo Ishii, Tokyo, Japan, assignor to Chugai Seiyaku Kabushiki Kaisha, Tokyo, Japan
Continuation of application Ser. No. 829,972, June 3, 1969. This application Oct. 18, 1971, Ser. No. 190,177
Claims priority, application Japan, June 5, 1968, 43/37,969
Int. Cl. A61k 17/00
U.S. Cl. 424—95                                    5 Claims

ABSTRACT OF THE DISCLOSURE

A preparation, useful for improving impaired consciousness and electroencephalogram abnormalities caused by cerebral edema is obtained by (a) centrifuging homogenized fresh animal brain suspension to provide mitochondria and supernatant (I) and recentrifuging supernatant (I) to obtain supernatant (III); (b) suspending said mitochondria in a suspension medium; (c) freezing and thawing said mitochondria suspension to decompose said mitochondria; (d) centrifuging said decomposed mitochondria suspension to obtain mitochondria debris and supernatant (II); (e) combining supernatants (II) and (III); and (f) dialyzing the combined supernatant to which a small quantity of albumin has been added to produce a diffusate comprising the active preparation.

---

This application is a continuation of co-pending application Ser. No. 829,972 filed June 3, 1969.

The present invention relates to a preparation, and its process of production, for improving cerebral dysfunction, particularly that resulting from head injuries causing unconsciousness and cerebeal edema.

In the study of brain cell swelling, it has been found that during the injuring of the brain cell the adenosine triphosphatase levels of brain mitochondria are reduced rapidly while, at the same time, swelling of the brain mitochondria and cerebral tissue occur. The relationship between the function of brain mitochondria and the swelling of brain cells has, accordingly, been examined and it has been revealed that an extract of mitochondria of animal-fresh brain specifically inhibits decrease of dinitrophenol dependent adenosine triphosphatase (below referred to as DNP-ATPase) activity and thus inhibits swelling of the mitochondria. It has also been found in an unconscious animal, a cat whose brain is experimentally injured through deflation of the cerebral compression, that an abnormally high voltage, slow EEG—recorded at the time of the head injury—returned to normal by administering the preparation of this invention, thereby showing that the preparation has improving effects for disorder of cerebral function, especially restoring consciousness.

The present invention will be more apparent from the following detailed description of specific embodiments which will so fully reveal the general nature of the invention that others can, by applying current knowledge, readily modify such embodiments and/or adapt them for various applications without departing from the generic concept, and, therefor, such adaptations and modifications should be and are intended to be comprehended within the meaning and range of equivalents. The embodiments will be more apparent from the attached drawing which shows an electroencephalogram (EEG) of a cat receiving the preparation of the present invention by intravenous injection.

The preparation used to improve cerebral functioning thereof is formed from fresh brain extract. It is preferable that the animal brain be rapidly taken out immediately after killing the animal, and the extract be prepared as described below. Animal brains which may be used may be selected, for example, from rats, cats, dogs, sheep, cattle or the like.

After removal of the brain from the animal, such brain is immediately placed in mannitol-ethylene-diaminetetraacetic acid solution, the pH is adjusted to 7.4 with potassium hydroxide, the whole procedure being preferably for 10–15 seconds, since taking any longer time results in formation of fatty acid which inhibits DNP-ATPase activity. The mitochondria may also be obtained in other known manners.

The resultant suspension, that is the suspension resulting from the above procedure comprising animal brain in five to ten times volume of mannitol-EDTA solution, is then homogenized and centrifuged, for example for ten minutes at 2,000 gravities. After removal of the precipitate, the supernatant is again centrifuged at a higher rate, e.g. 20,000 gravities, to obtain precipitated mitochondria and supernatant (I). The obtained mitochondria is again suspended in a suitable medium, and is freezed and thawed, and then the suspension is centrifuged at an even higher rate, for example one hour at 50,000 gravities to obtain a second supernatant (II).

In the meantime, the supernatant (I) is separately centrifuged, e.g. for two hours at 50,000 gravities, to give supernatant (III). The separate supernatants (II) and (III) are then mixed with the addition of albumin to make, for example, a solution having a concentration of 1%. Such supernatant with albumin is then dialyzed, such as by being poured into a dialysis tube, against 0.25 M mannitol-5 mM. phosphate buffer solution (pH 7.4) for 24 hours at 0–4° C. The active preparation of the present invention results from such dialysis as the diffusate. These steps are schematically shown as follows:

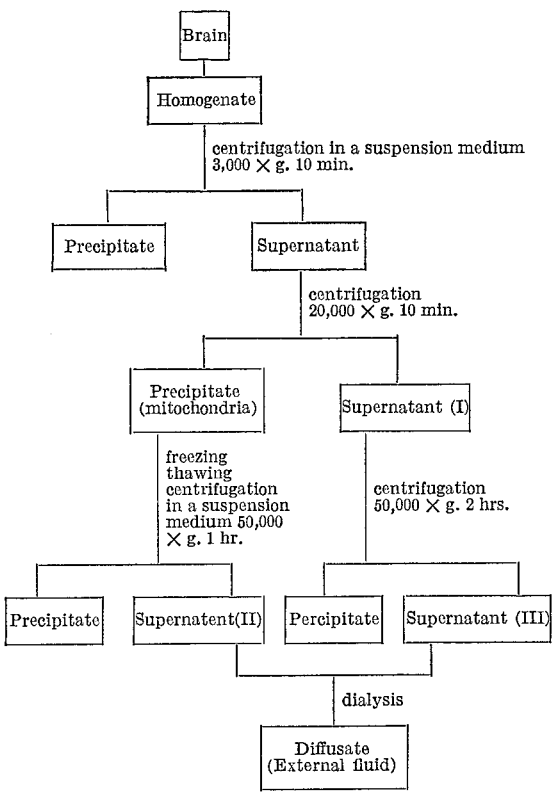

By mixing the supernatants (II) and (III) the activity of the preparation is increased, and by adding the albumin a better preparation is obtained because mixing of fatty acid in the preparation is prevented; accordingly, fatty acid, which is an inhibitor of DNP-ATPase is formed in only small amounts during the above-described process.

The diffusate solution thus obtained, the active factor or desired preparation, is lyophilized for preservation purposes, the lyophilized preparation being storable for long periods of time. For use, the lyophilized preparation is mixed with suitable liquid, such as water, to provide an injectable preparation of the desired concentration.

The following examples, illustratively presented to show the formation of the preparation, will more fully describe the invention without limitation:

EXAMPLE 1

Immediately after decapitation of a rat, the cerebral hemisphere was taken out and was put into five times the volume of cold mannitol-EDTA solution (containing 0.3 M mannitol and 0.01 mM. EDTA at pH 7.4. After a total of only about ten seconds, the brain sample was homogenized moderately with a Potter-Elvehjem glass homogenizer, and the homogenate was first centrifuged for ten minutes at 2,000 g. and then the supernatant was centrifuged again for 10 minutes at 20,000 g. to obtain supernatant (I) and precipitated mitochondria. Such mitochondria was suspended uniformly in ten milliliters of cold mannitol-EDTA solution and the suspension was frozen at —20° C. After thawing to room temperature, the suspension was centrifuged for an hour under cooling at 50,000 g. to obtain the supernatant (II). In the meantime, the supernatant (I) was separately centrifuged for two hours at 50,000 g. to obtain the supernatant (III).

The supernatants (II) and (III) were then mixed and albumin was added thereto to provide a concentration of about 1%. The mixture was dialyzed against 0.25 M mannitol-5 mM. phosphate buffer solution for twenty-four hours. Ninety milliliters of external solution (diffusate) were obtained and lyophilized. The lyophilized preparation is suitable for injection.

EXAMPLE 2

Immediately after killng a sheep, cerebral tissue was obtained with a suction pump from a trephine hole made in the parietal area, and the obtained tissue was suspended in the same manner as described above in Example 1 to give the preparation suitable for injection in accordance with the present invention.

The following example shows the use of the preparation of the present invention, by way of example and without limitation:

EXAMPLE 3

A cat was lightly anesthetized with sodium phenobarbiturate and its head was fixed to make a trephine hole on the right parietal area. A small rubber balloon to which a polyethylene tube was connected was placed in the epidural space and electrodes for EEG monitoring were placed on both the parietal areas. For both cortical recordings, a monopolar electrode was used, and the indifferent electrode was placed on the frontal cranium. The polyethylene tube and the electrodes were fixed in place with dental cement.

When the EEG abnormalities were eliminated after the cat was free of the effects of anesthesis, the balloon was then inflated by the addition thereto of increments of 0.2 milliliter of physiological saline. With compression, high voltage slow waves and spindle bursts first appeared on the compressed side. When slow waves additionally appeared on the opposite, the addition of physiological saline was stopped and the polyethylene tube was closed. Brain compression was continued for twenty-four hours whereupon the physiological saline was removed and the rubber balloon deflated, observation being continued for about three hours. The upper left hand EEG on the drawing shows the pattern two hours after deflation of the balloon.

After it was observed that general conditions became normal and that the cat had still not become conscious, two milliliters of the preparation of the present invention (such as produced in Examples 1 and 2) containing the effective component corresponding to 3–7 grams of the brain was injected intraveneously (the first injection) and electroencephalogram was recorded at the time of 20, 30 and 40 minutes after the injection. At sixty minutes after the first injection, the same volume of the same preparation was again injected in the same manner (the second injection) and electroencephalogram was recorded at the time of 5, 10 and 20 minutes after the second injection. The results are shown in the attached drawing.

It is clear from these results that the present preparation improves impaired consciousness and/or electroencephalogram abnormality by reducing cerebral edema.

It is to be understood that the invention is not limited to the embodiment disclosed which is illustratively offered and that modifications may be made without departing from the invention.

What is claimed is:
1. A process for manufacturing a preparation for improving consciousness and electroencephalogram abnormalities caused by cerebral edema, comprising the steps of
 (a) centrifuging homogenized fresh animal brain suspension at 2000 g. for 10 minutes to provide mitochondria and supernatant;
 (b) centrifuging said supernatant at 20,000 g. for 10 minutes to obtain supernatant (I and a precipitate mitochondria;
 (c) suspending said precipitate mitochondria in a suspension medium;
 (d) freezing and thawing said precipitate mitochondria suspension to decompose said mitochondria;
 (e) centrifuging said decomposed mitochondria suspensionat 50,000 g. for 1 hour to obtain mitochondria debris and supernatant (II);
 (f) centrifuging said supernatant (I) at 50,000 g. for 2 hours to obtain supernatant (III);
 (g) combining said supernatants (II) and (III); and
 (h) adding albumin to a concentration of 1% and dialyzing the said combined supernatant for about 24 hours at 0 to 4° C. against 0.25 M mannitol-5 mM. phosphate buffer solution pH 7.4 to produce a diffusate comprising the active preparation.

2. The process of claim 1 wherein said homogenized fresh animal brain suspension is obtained by placing the brain of freshly killed rat, cat, dog, sheep or cattle in a mannitol-ethylene diamine tetracetic acid solution and homogenizing the brain.

3. The process of claim 1 wherein said homogenized fresh animal brain suspension is obtained by homogenizing fresh brain in 5–10 times volume mannitol-EDTA solution containing 0.3 M mannitol and 0.2 mM. EDTA at a pH of 7.4.

4. The process of claim 1 wherein said suspending medium in which said mitochondria is suspended consists essentially of a mannitol-EDTA solution.

5. The product prepared by the process of claim 1.

References Cited

The Journal of Biochemistry, vol. 59, No. 5, 1966, pp. 501–510.

ALBERT T. MEYERS, Primary Examiner

F. E. WADDELL, Assistant Examiner